(12) United States Patent
Miyazaki (10) Patent No.: US 9,003,911 B2
(45) Date of Patent: Apr. 14, 2015

(54) BALL SCREW DEVICE

(75) Inventor: Kazunari Miyazaki, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/059,512

(22) PCT Filed: Feb. 3, 2011

(86) PCT No.: PCT/JP2011/000624
§ 371 (c)(1),
(2), (4) Date: Feb. 17, 2011

(87) PCT Pub. No.: WO2012/077247
PCT Pub. Date: Jun. 14, 2012

(65) Prior Publication Data
US 2013/0239725 A1    Sep. 19, 2013

(30) Foreign Application Priority Data
Dec. 8, 2010   (JP) .................................. 2010-273685

(51) Int. Cl.
*F16H 25/22*    (2006.01)

(52) U.S. Cl.
CPC ................................. *F16H 25/2214* (2013.01)

(58) Field of Classification Search
CPC .................................................. F16H 25/2214
USPC .............. 74/424.82, 424.86, 424.87, 424.83, 74/424.84
See application file for complete search history.

(56) References Cited

U.S. PATENT DOCUMENTS

| | | | |
|---|---|---|---|
| 2,851,897 A | | 9/1958 | Cochrane |
| 5,496,113 A | * | 3/1996 | Winkelmann et al. .......... 384/13 |
| 7,992,461 B2 | * | 8/2011 | Lin et al. .................... 74/424.86 |
| 2003/0145670 A1 | * | 8/2003 | Fujita et al. .................. 74/89.44 |

(Continued)

FOREIGN PATENT DOCUMENTS

| | | |
|---|---|---|
| JP | 2006-46570 A | 2/2006 |
| JP | 2006-125581 A | 5/2006 |

(Continued)

OTHER PUBLICATIONS

English-language translation of reference C1 (Japanese-language International Search Report) previously filed on Apr. 25, 2011 (Two (2) pages).

(Continued)

*Primary Examiner* — Justin Krause
*Assistant Examiner* — Gregory Prather
(74) *Attorney, Agent, or Firm* — Crowell & Moring LLP (57) ABSTRACT

A ball screw device even with a small lead angle and a small number of circulation rolls, includes a rotational part, which keeps unequal division of tongue portions and legs connected to the tongue portions to a minimum and ensures the strength of the tongue portions. A recirculating part of the ball screw device includes a pair of legs, each having a tongue portion for scooping up balls in a direction approximately tangential to a spiral raceway, and a main body connecting the pair of legs. First divided faces for dividing the pair of legs along a ball recirculating path, and a second divided face for dividing the main body along the ball recirculating path are also included. The second divided face is formed by an upper divided face and a lower divided face of the ball recirculating path so that the upper divided face and the lower divided face intersect with each other when viewed from a flat surface of the nut.

1 Claim, 6 Drawing Sheets

(56) References Cited

U.S. PATENT DOCUMENTS

| | | | |
|---|---|---|---|
| 2003/0172759 A1* | 9/2003 | Hayashi | 74/424.86 |
| 2004/0000208 A1* | 1/2004 | Michioka et al. | 74/424.86 |
| 2005/0016308 A1* | 1/2005 | Hayashi | 74/424.86 |
| 2006/0027038 A1* | 2/2006 | Ohkubo et al. | 74/424.86 |
| 2006/0032323 A1 | 2/2006 | Ohkubo et al. | |
| 2007/0006676 A1* | 1/2007 | Mizuhara et al. | 74/424.86 |
| 2007/0137348 A1* | 6/2007 | Oetjen | 74/424.86 |
| 2007/0204713 A1* | 9/2007 | Chen | 74/424.86 |
| 2008/0190231 A1* | 8/2008 | Chiu et al. | 74/424.86 |
| 2009/0013811 A1* | 1/2009 | Hsu | 74/424.87 |
| 2013/0239725 A1* | 9/2013 | Miyazaki | 74/424.86 |

FOREIGN PATENT DOCUMENTS

| | | |
|---|---|---|
| JP | 2010-38196 A | 2/2010 |
| JP | 2010-151168 A | 7/2010 |
| WO | WO 2008/123451 A1 | 10/2008 |

OTHER PUBLICATIONS

Japanese-language International Search Report dated Mar. 29, 2011 including partial English-language translation (four (4) pages).

International Preliminary Report on Patentability (PCT/IB/338 & PCT/IB/373), including Written Opinion (PCT/ISA/237) dated Jun. 20, 2013 (five (5) pages).

Chinese Office Action dated Apr. 29, 2014 with mechanical English translation thereof {eight (8) pages).

* cited by examiner

BALL SCREW DEVICE

TECHNICAL FIELD

The present invention relates to a ball screw device usable for various kinds of machinery such as machine tools, injection molding machines, etc., more particularly to a ball screw device including a tubular rotational part.

BACKGROUND ART

A ball screw device according to Patent Document 1 is disclosed as this type of conventional ball screw device. The ball screw device disclosed in Patent Document 1 results from dividing a resin rotational part (not shown) into two parts and arranging them such that the centerlines of recirculating paths within legs of the rotational part fitted to recirculation holes of a nut approximately coincide tangentially (approximately tangential to a spiral raceway) and in a lead angle direction of both grooves so as to provide smooth scooping up of balls (rolling elements).

However, since the ball screw device disclosed in Patent Document 1 has the rotational part divided into two parts radially along the centerlines of the ball recirculating paths, even a tongue portion for scooping up the balls is divided, and there is concern that the strength of the tongue portion will be reduced.

Therefore, the ball screw device of Patent Document 2, which avoids such division of the tongue portion, has been disclosed.

Figure 6A:
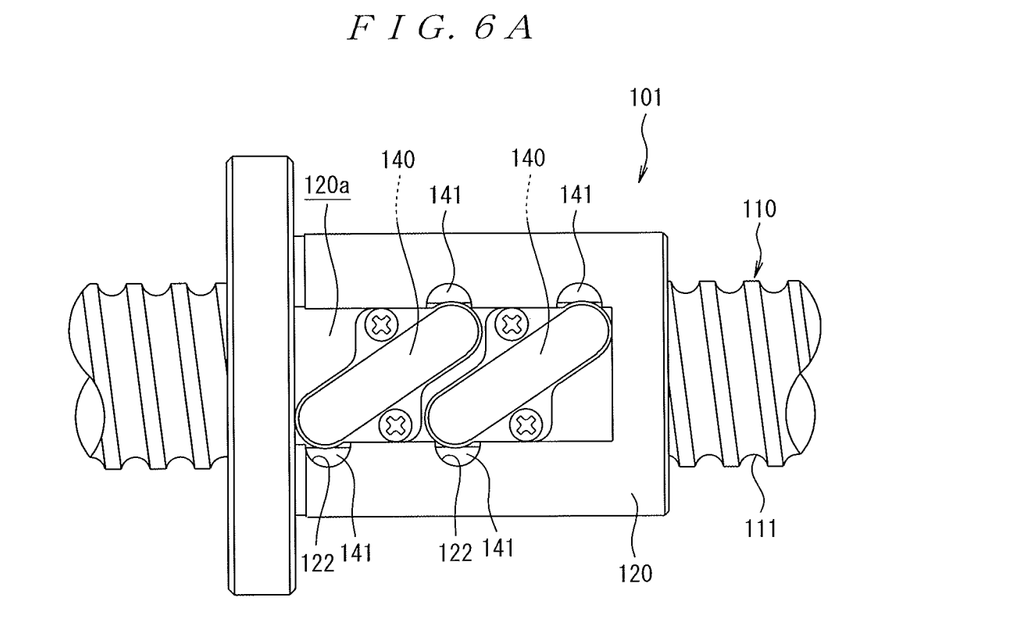
Figure 6B:
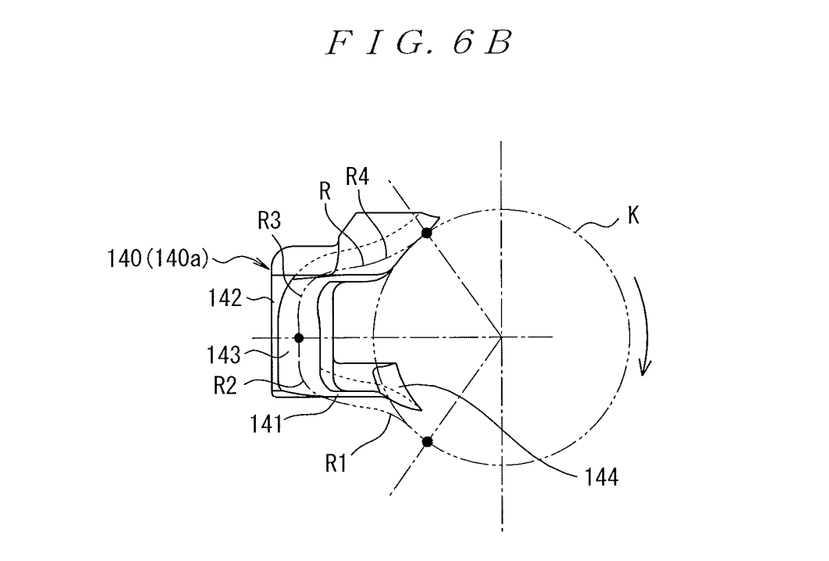

FIG. 6 is a diagram illustrative of a configuration of the conventional ball screw device disclosed in Patent Document 2, where FIG. 6(a) is a top view and FIG. 6(b) is a view of a rotational part when seen from the axial direction of a screw shaft. As shown in FIGS. 6(a) and 6(b), a ball screw device 101 disclosed in Patent Document 2 has a nut 120 including a spiral groove (not shown) corresponding to an inner surface groove 111 fitted to a screw shaft 110 including a spiral external surface groove 111. Multiple balls (not shown) are loaded in a rollable fashion along a spiral raceway K between the grooves 111 and the groove of the nut 120.

Moreover, a flat surface 120a is formed on the peripheral surface of the nut 120, and two pairs of recirculation holes 122 passing to the spiral raceway K are bored in the flat surface 120a. A recirculating part 140 is established so that both ends are fitted to the pairs of recirculation holes 122, forming a ball recirculating path where the balls are lead to the outside of the nut 120 through one of the recirculation holes 122 and then back to the spiral track K through the other of the recirculation holes 122. The recirculating part 140 is comprised by a pair of legs 141, each having a tongue portion 144 for scooping up the balls that roll along the spiral raceway K on ends thereof in a direction approximately tangential to the spiral raceway K, and a main body 142 connecting the pair of legs 141. Furthermore, the recirculating part 140 is formed including the pair of legs 141 and the main body 142 connecting the pair of legs 141, the interior made as a ball recirculating path R, and divided bodies 140a, which are divided in two point symmetrically along the ball recirculating path R, fitted by divided faces. Circulating grooves 143 constituting the ball recirculating path R are formed in the divided faces of the respective divided bodies 140a.

The circulating grooves 143 constituting the ball recirculating path R each includes a first curvature portion R1, a second curvature portion R2, a third curvature portion R3, and a fourth curvature portion R4. The first curvature portion R1 is a portion leading a ball, which is scooped up from the spiral raceway K by the tongue 144 of one leg 141 of the pair of legs 141 and 141, to the outside of the nut 120 in a direction having a predetermined angle or approximately coinciding with the axial direction of the recirculation hole 122. The second curvature portion R2 is a portion leading the ball having passed the first curvature portion R1 to the other leg 141. The third curvature portion R3 is a portion leading the ball having passed the second curvature portion R2 to the inside of the other leg 141 via the main body 142. The fourth curvature portion R4 is a portion leading the ball having passed the third curvature portion R3 to the position of the tongue portion 144 of the other leg 141.

PRIOR ART DOCUMENTS

Patent Documents

Patent Document 1: U.S. Pat. No. 2,851,897 Specification
Patent Document 2: JP 2006-125581A

SUMMARY OF THE INVENTION

Problem to be Solved by the Invention

Figure 7A:
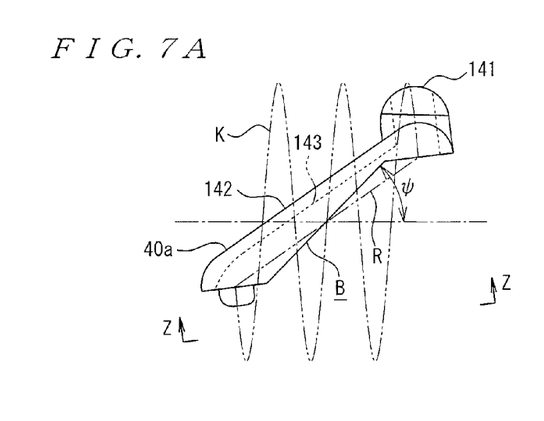
Figure 7B:
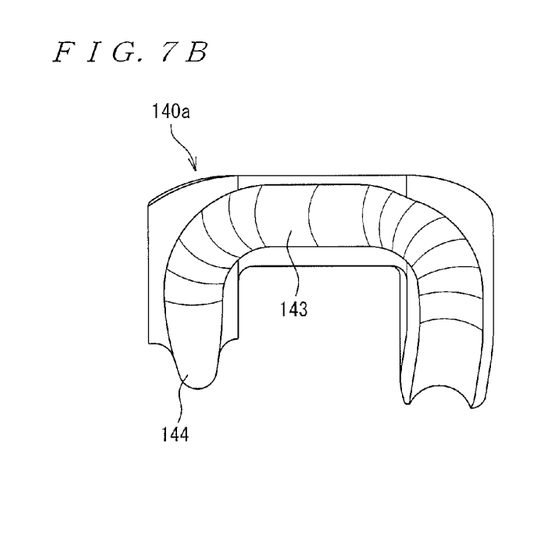
Figure 7C:
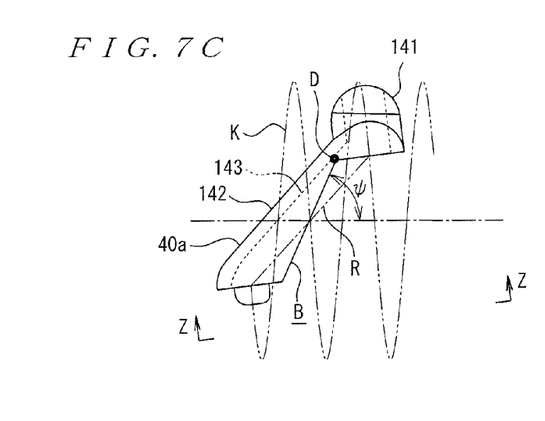
Figure 7D:
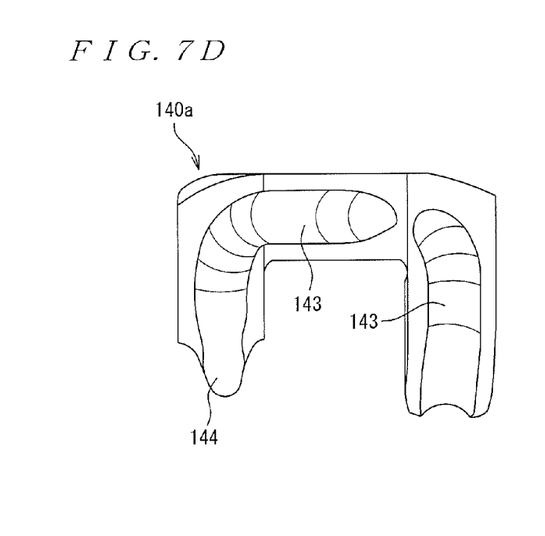

However, the rotational part according to the ball screw device of Patent Document 2, when applied to a ball screw device having a small lead angle and a small number of circulation rolls, there is a chance that unequal division of the tongue portions or the legs connected to the tongue portions is inevitable if prevention of loss of the ball recirculating path R is attempted. More specifically, as shown in FIGS. 7(a) and 7(b), if the number of circulation rolls of the ball screw device is 2.5 rolls, divided bodies 140a formed with a proper ball recirculating path R without dividing unequally the tongue portions 144 and the legs 141 connected to the tongue portions 144 may be fabricated. On the other hand, if the number of circulation rolls of the ball screw device becomes small (1.5 rolls, for example) as shown in FIGS. 7(c) and 7(d), angle ψ formed by a cross-sectional surface B of the divided body 140a in the axial direction of the nut 120 increases, and the ball recirculating path R at point D is lost. In other words, with a ball screw device having a small lead angle and a small number of circulation rolls, there are cases where fabrication of the divided body 140a having a ball recirculating path R formed without dividing unequally the tongue portions 144 and the legs 141 connected to the tongue portions 144 is impossible. Accordingly, with a ball screw device having a small lead angle and a small number of circulation rolls, due to reduction in the strength of the tongue portions 144 as a result of unequal division of the tongue portions 144 and the legs 141 connected to the tongue portions 144 being inevitable, there is room for improvement thereof.

Therefore, the present invention is made in light of such a problem, and aims to provide a ball screw device capable of keeping unequal division of tongue portions and legs connected to the tongue portions to a minimum, securing the strength of the tongue portions, and evenly divide and form circulating paths in order to circulate balls more smoothly even if the lead angle and the number of circulation rolls is low.

Solution to the Problem

A ball screw device according to an embodiment of the present invention in order to solve the aforementioned problem includes: a screw shaft having a spiral groove on the outer surface; a nut having on the inner surface a spiral groove corresponding to the groove of the screw shaft and screwed with the screw shaft; a plurality of balls loaded in a rollable fashion along a spiral raceway between both of the grooves; and a rotational part having both ends fitted to respective recirculation holes of a pair of recirculation holes formed in a flat surface, which is bored on a circumferential side surface of the nut, in a direction approximately orthogonal to an centerline of the nut, so as to create a ball recirculating path for leading the plurality of balls rolling along the spiral raceway to the outside of the nut from one recirculation hole of the pair of recirculation holes, and returning the plurality of balls to the spiral raceway from the other recirculation hole.

The rotational part includes a pair of legs that include a tongue portion for scooping up the balls that roll along the spiral raceway on the ends of the legs in a direction approximately tangential to the spiral raceway and that have both ends fitted to the recirculation holes of the nut, and a main body connecting the pair of legs.

It also has a first divided face for dividing the pair of legs along the ball recirculating path, and a second divided face for dividing the main body along the ball recirculating path; wherein the second divided face is formed such that an upper divided face and a lower divided face of the ball recirculating path intersect with each other when viewed from the flat surface of the nut.

Advantageous Effect of the Invention

According to the ball screw device according to the embodiment of the present invention, a ball screw device is provided capable of keeping unequal division of tongue portions and legs connected to the tongue portions to a minimum, securing the strength of the tongue portions, and evenly divide and form circulating paths in order to circulate balls more smoothly even if the lead angle and the number of circulation rolls is low.

BRIEF DESCRIPTION OF THE DRAWINGS

FIGS. 5(a), 5(b) and 5(c) are diagrams of the divided body of a rotational part according to the embodiment of the ball screw device of the present invention, where FIG. 5(a) is seen from arrow Y of FIG. 4, FIG. 5(b) is seen from arrow X of FIG. 4, and FIG. 5(c) is seen from the axial direction of a screw shaft (when seen from the opposite direction to the arrow X direction of FIG. 4);

FIGS. 6(a) and 6(b) are diagrams illustrative of a configuration of a conventional ball screw device, where FIG. 6(a) is a top view and FIG. 6(b) is a view of a rotational part when seen from the axial direction of a screw shaft; and FIGS. 7(a) to 7(d) are diagrams of a divided body of the conventional rotational part, where FIG. 7(a) is a diagram of the rotational part with 2.5 rolls when seen from a flat surface direction of a nut, FIG. 7(b) is seen from arrow Z of FIG. 7(a), FIG. 7(c) is a diagram of the rotational part with 1.5 rolls when seen from a flat surface direction of a nut, and FIG. 7(d) is seen from arrow Z of FIG. 7(c).

DESCRIPTION OF EMBODIMENTS

A ball screw device of an embodiment of the present invention will now be described with reference to the drawings.

Figure 1:
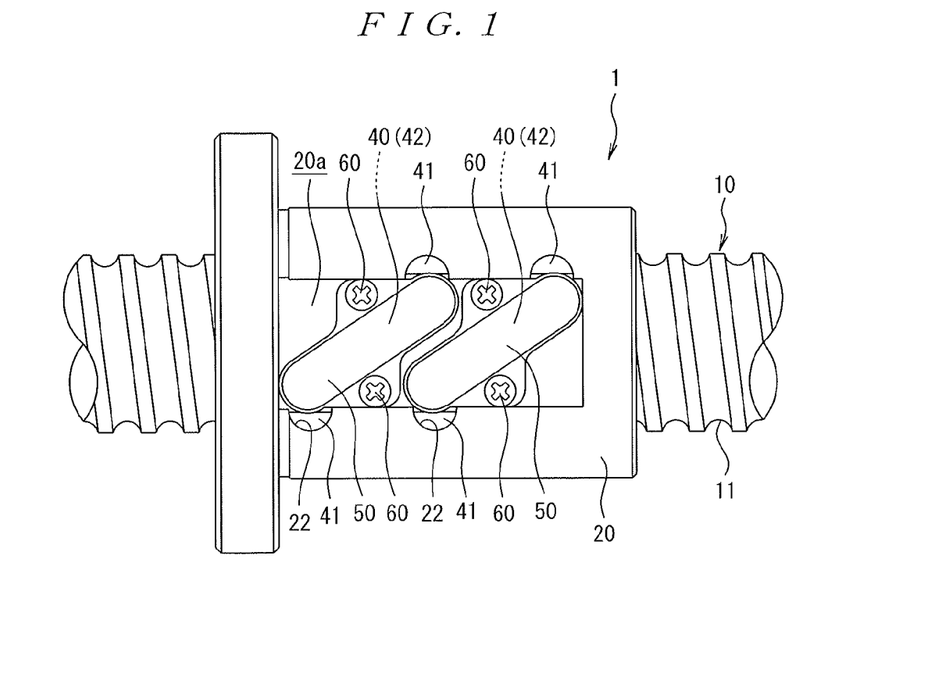
FIG. 1 is a top view of an embodiment of a ball screw device according to the present invention.
Figure 2:
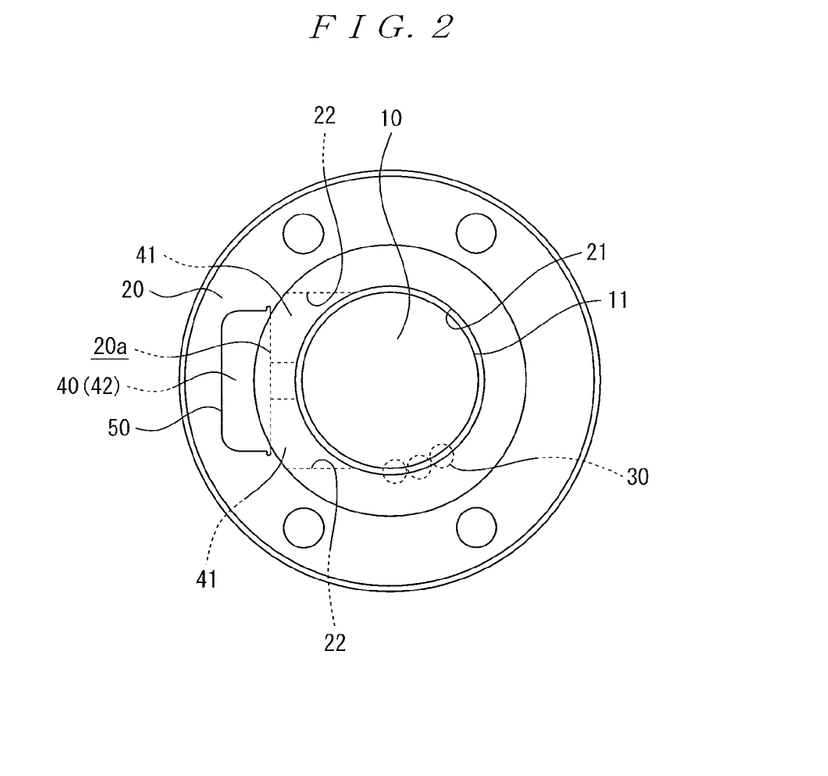
FIG. 2 is a right side view of FIG. 1.
Figure 3:
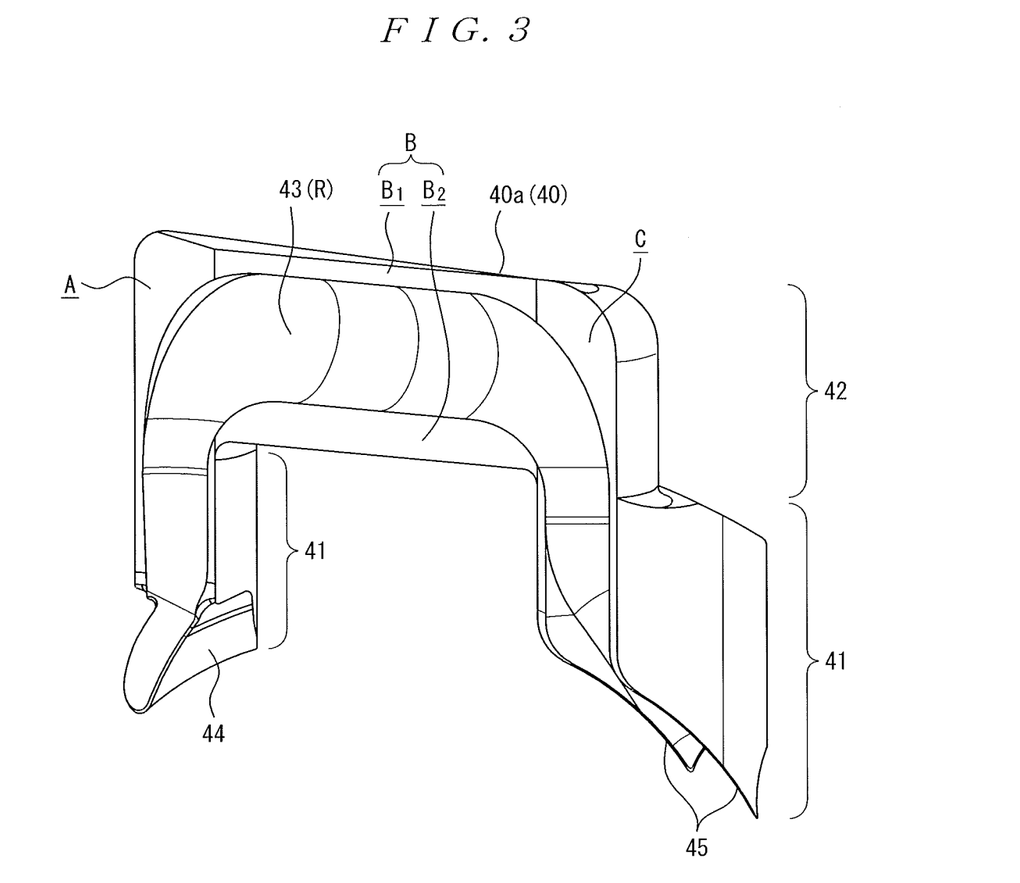
FIG. 3 is a perspective view illustrative of a divided body of a rotational part according to the embodiment of the ball screw device of the present invention.
Figure 4:
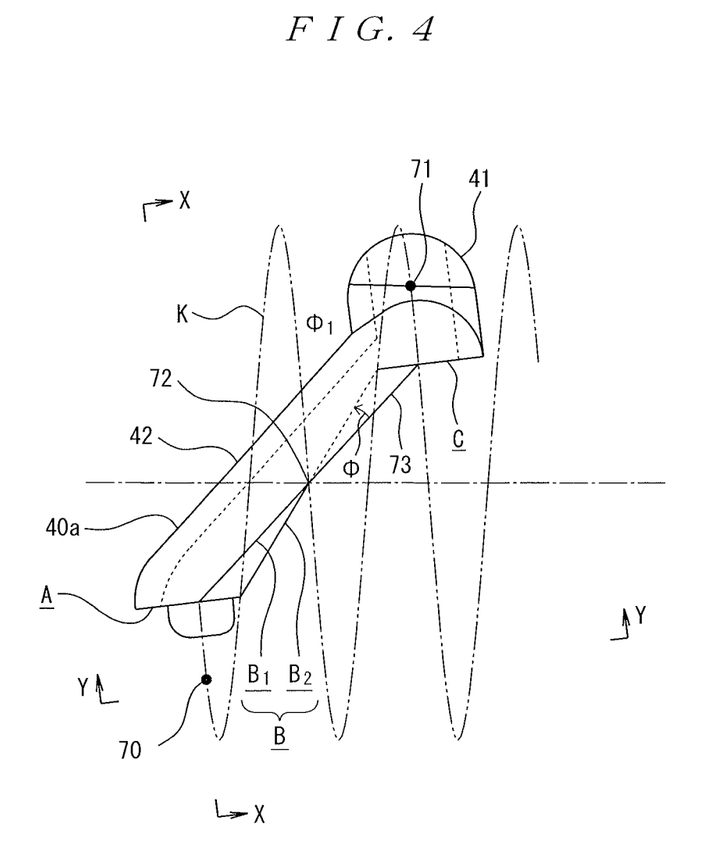
FIG. 4 is a view of the divided body of the rotational part according to the embodiment of the ball screw device of the present invention when seen from a flat surface direction of a nut.
Figure 5A:
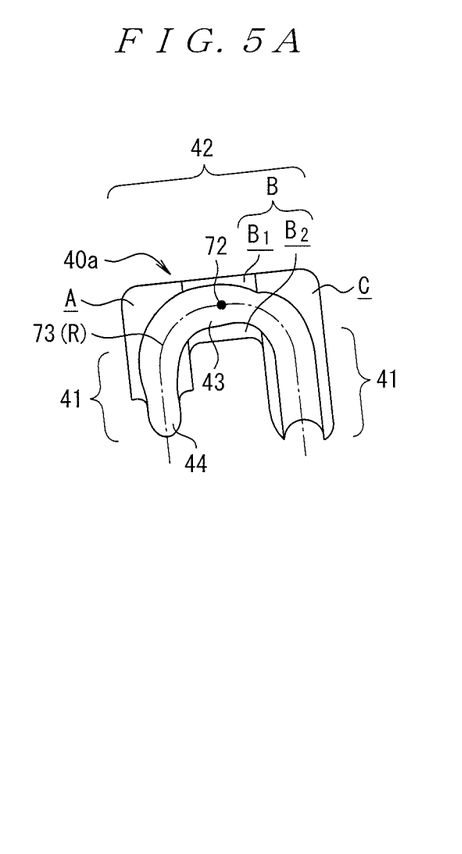
Figure 5B:
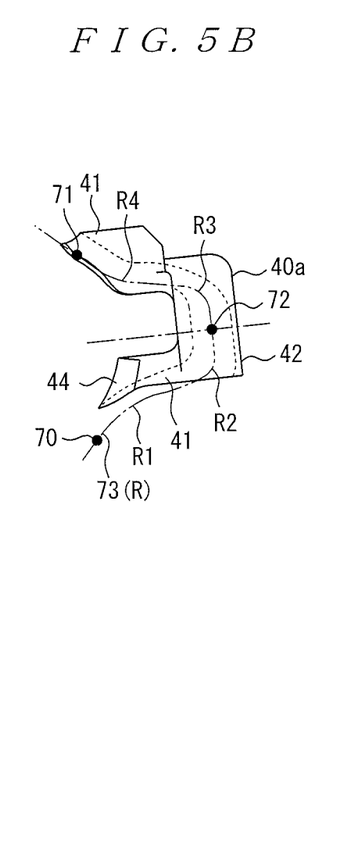
Figure 5C:
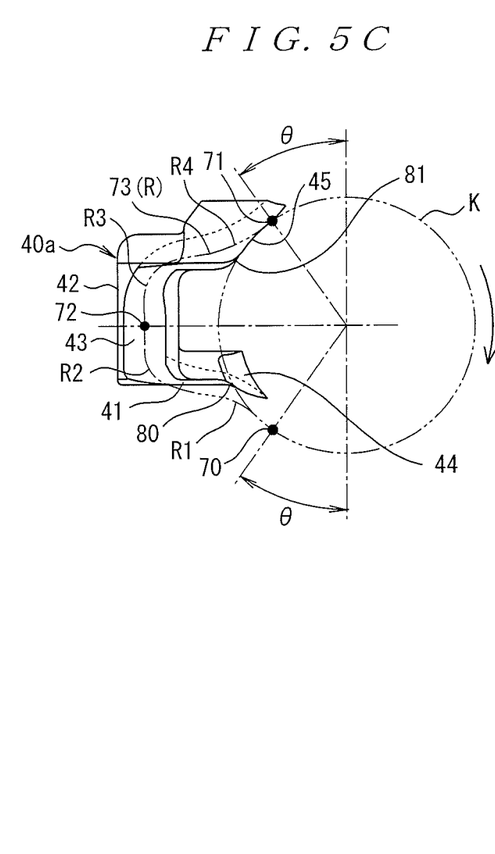

FIG. 1 is a top view of an embodiment of a ball screw device according to the present invention. FIG. 2 is a right side view of FIG. 1. FIG. 3 is a perspective view illustrative of a divided body of a rotational part according to the embodiment of the ball screw device of the present invention. FIG. 4 is a view of the divided body of the rotational part according to the embodiment of the ball screw device of the present invention when seen from a flat surface direction of a nut. FIGS. 5(a) to 5(c) are diagrams of the divided body of a rotational part according to the embodiment of the ball screw device of the present invention, where FIG. 5(a) is seen from arrow Y of FIG. 4, FIG. 5(b) is seen from arrow X of FIG. 4, and FIG. 5(c) is seen from the axial direction of a screw shaft.

<Configuration of Ball Screw Device>

As shown in FIGS. 1 and 2, a ball screw device 1 has a nut 20, which has a spiral groove 21 inside corresponding to a surface groove 11, fitted to a screw shaft 10 having a spiral groove 11 on the outer surface, and a groove 21 of the nut 20 faces the groove 11 of the screw shaft 10, and a spiral raceway that receives a load is formed between both grooves.

Multiple balls 30 as rolling elements are loaded in a rollable fashion along the spiral raceway, and the nut 20 is moved axially via rolling of the balls 30 by rotation of the screw shaft 10 (or the nut 20).

Apart of the peripheral surface of the nut 20 has a flat surface 20a, where recirculating parts 40 are fixed on the flat surface 20a by press-down fittings 50 and setscrews 60, for example.

Each of the recirculating parts 40 is formed by including a pair of legs 41 and a main body 42 connecting the pair of legs 41, having its own interior made as a ball recirculating path R, and joining together the divided faces of divided bodies 40a (see FIG. 3), which are divided in two point symmetrically along the ball recirculating path R. A circulating groove 43 constituting the ball recirculating path R is formed in the divided faces of the respective divided bodies 40a.

This allows easy assembly of the recirculating parts 40 by joining together two of the divided bodies 40a of the same shape, and reduction in cost due to use of only one kind of molding die for the divided bodies 40a. Note that in this embodiment, two of the recirculating parts 40 are arranged to form two circulation circuits.

The pair of legs 41 is spaced from each other axially and radially along the shaft line of the screw shaft 10. A tongue portion 44 for scooping up the balls that roll along the spiral raceway between the grooves 11 and 21 in a direction approximately tangential to the spiral raceway is provided at a front edge of the respective legs 41.

These legs 41 are fitted to a pair of recirculation holes 22 bored in the flat surface 20a of the nut 20 in a direction approximately orthogonal to the centerline of the nut 20 and communicating with the spiral raceway between the grooves 11 and 21. The pair of recirculation holes 22 is arranged with axial centers separated the same distance away from the shaft line of the screw shaft 10 in opposite directions therefrom. Note that a relief 45 (see FIG. 3) for preventing the front edge of the leg 41 on the side, where the tongue portion 44 of the divided body 40a of the recirculating part 40 is not provided, from touching the screw shaft 10 is formed on that front edge of the leg 41.

The recirculating part 40 contributes to formation of an endless spiral raceway for the balls 30, which roll along the spiral raceway between the grooves 11 and 21, are scooped up and led to the inside of the main body 42 outside of the nut 20, and are then returned to the spiral raceway from the other leg 41.

In this embodiment, with reference to FIGS. 5(b) and 5(c), the ball recirculating path R within the recirculating part 40 has a first curvature portion R1, which leads the scooped-up balls 30 to the outside of the nut 20 in the direction having a predetermined angle or approximately coinciding with the axial direction of each recirculation hole 22, a second curvature portion R2, which leads the balls 30 having passed the first curvature portion R1 to the other leg 41, a third curvature portion R3, which leads the balls 30 having passed the second curvature portion R2 to the inside of the other leg 41 via the main body 42, and a fourth curvature portion R4, which leads the balls 30 having passed the third curvature portion R3 to the position of the tongue 44 of the other leg 41.

Moreover, the recirculating part 40 is divided into two point symmetrically along the ball recirculating path R at a position but the respective tongue portions 44 of the pair of legs 41. More specifically, as shown in FIG. 3 to FIG. 5, a first divided face A and a first divided face C, which divides the legs 41, of divided faces of the recirculating part (divided body 40a) are divided so as to be approximately orthogonal to a flat surface (flat surface including a group of normal lines for the central centerline of the ball recirculating path R at the respective curved portions: surface along the page top of FIG. 5(b)) including the central centerline of the ball recirculating path R at the first curvature portion R1 and the fourth curvature portion R4. Furthermore, a second divided face B, which divides the main body 42, of the divided faces of the recirculating part 40 (divided body 40a) has a divided face $B_1$ and a divided face $B_2$. The divided face $B_1$ and the divided face $B_2$ are each divided in a direction joining the divided face A and the divided face C, passing through the path center 72 of FIG. 5(a).

<Configuration of Rotational Part>

The rotational part (divided body) will now be described with reference to FIG. 3 to FIG. 5. Note that in FIG. 4 and FIG. 5, reference numeral 70 denotes a ball scooping position of one leg, 71 denotes a ball scooping position of the other leg, 72 denotes a midpoint of the ball recirculating path R, 73 denotes the centerline of the ball recirculating path R, and K denotes the ball center trajectory on the spiral raceway (load zone). When a ball 30 is scooped up on the one leg 41 side, the ball scooping position 71 functions as a ball returning position, and when the ball 30 is scooped up on the other leg 41 side, the ball scooping position 70 functions as a ball returning position. The case of scooping up the ball on the one leg 41 side will be described next.

First, the ball recirculating path R within the recirculating part 40 will be described with progression of the ball 30 while referencing FIG. 4 and FIG. 5. In this case, the screw shaft 10 is assumed to rotate clockwise when seen axially, as shown in FIG. 5(c).

The ball 30 that has rolled between the grooves 11 and 21 along the spiral raceway or load zone is scooped up approximately tangential to the spiral raceway at the ball scooping position 70 of the one leg 41 by the tongue 44, veers off from the spiral raceway, and enters the ball recirculating path R, where θ in FIG. 5(c) is an apparent scooping angle for obtaining a load capacity, and is set to be greater than 0 and less then or equal to 90° (actually approximately 20 to 45°).

The ball 30 that has moved from the ball scooping position 70 to the ball recirculating path R changes traveling direction along the first curvature portion R1 within the ball recirculating path R to approximately the same direction as the axial direction of the recirculation holes 22, namely direction of the main body 42 of the recirculating part 40.

The ball 30 that passes the first curvature portion R1 and travels toward the recirculating part 40 changes to face the other leg 41 along the second curvature portion R2, passes along the ball recirculating path R within the main body 42 of the recirculating part 40, and reaching the midpoint 72 of the ball recirculating path R.

The recirculating path from the midpoint 72 of the ball recirculating path R to the third curvature portion R3, the fourth curvature portion R4, and reaching the ball returning position 71 of the other leg 41 has a point symmetric form to the path ranging from the ball returning position 70 of the one leg 41 to the midpoint 72 of the ball recirculating path R.

In this manner, the recirculating path R within the recirculating part 40 has the first curvature portion R1 (or the fourth curvature portion R4), which leads the ball 30 scooped up from the spiral raceway by the tongue portion 44 of the one leg 41 of the pair of legs 41 to the outside of the nut 20 in a direction approximately the same as the axial direction of the recirculation holes. This allows a smaller recirculation hole 22 than when the portion of the first curvature portion R1 (or the fourth curvature portion R4) is a straight line, and an apparent scooping angle θ for obtaining a load capacity may thus be provided without needlessly increasing the size of recirculation hole 22.

As a result, scooping up of the ball 30 in a direction approximately tangential to the spiral raceway may be easily carried out, interference of the recirculation holes 22 of the nut 20 to the groove 21 in the load zone may be prevented while keeping the apparent scooping angle κ for obtaining a load capacity, and multiple circulation circuits may be provided to a single nut 20 without excessively lengthening the entire length of the nut 20.

Note that the travelling direction of the ball 30 after it has passed the first curvature portion R1 need not always be along the centerline of the recirculation hole 22, but between the first curvature portion R1 and the second curvature portion R2 or inflexion points of the respective curvature portions, and between the third curvature portion R3 and the fourth curvature portion R4 or inflexion points of the respective curvature portions, it may be at a slant so that the angle formed by the travelling direction of the ball 30 and the centerline of the recirculation hole 22 is 0° or greater and less than the apparent scooping angle θ.

Slanting the travelling direction (direction of the recirculating path R) of the ball 30 relative to the centerline of the recirculation hole 22 of the nut 20 in this manner once it has passed the first curvature portion R1 allows increase in bending R of the first curvature portion R1 and the second curvature portion R2, thereby allowing reduction in centrifugal force of the ball 30 at the time of passing the first curvature portion R1 so as to prevent wear or damage of the recirculating part 40 due to the centrifugal force and make circulation of the ball 30 smoother.

Moreover, while the recirculation holes 22 of the nut 20 may be round holes, it is preferable that they are holes having a longer dimension than the width of an oval, ellipse, or the like, and that the longitudinal direction thereof is approximately along the spiral raceway between the grooves 11 and 21.

Forming such recirculation hole 22 allows prevention of interference of the recirculation holes 22 to the adjacent groove 21 in the load zone even with a ball screw device having adjacent grooves 21, such as a ball screw device with a small lead or a multithread ball screw device.

<Configuration of Divided Body>

The configuration of the aforementioned recirculating part 40 having the recirculating path R and the divided bodies 40a constituting the recirculating part 40 will be described next.

As shown in FIG. 3 and FIG. 4, the divided faces of the respective divided bodies 40a, which result from dividing the recirculating part 40 into two along the recirculating path R, are a first divided face A of the one leg 41 including an end of the main body 42, a first divided face C of the other leg 41 including an end of the main body 42, and a second divided face B of the intermediate portion of the main body 42.

(First Divided Faces A and C)

The first divided face A is a flat surface approximately orthogonal to a flat surface including the central centerline of the ball recirculating path R at the first curvature portion R1 (i.e., flat surface including a group of normal lines for the central centerline of the ball recirculating path R at the curvature portion R1: surface along the page top of FIG. 5(b)). The first divided face A may thus prevent reduction in the strength of the tongue portions 44 without unequally dividing the tongue portions 44 and the legs 41 connected to the tongue portions 44. The first divided face C is adjacent to the first divided face A when the two divided bodies 40a are fitted point symmetrically.

(Second Divided Side B)

The second divided face B is a face joining the first divided face A and the first divided face C, and is constituted by an upper side divided face $B_1$ and a lower side divided face $B_2$ orthogonal to each other when viewed from the flat surface 20a in a state where the recirculating part 40 is fixed to the flat surface 20a of the nut 20. Moreover, the divided face $B_1$ in the illustrated example includes the central centerline of the ball recirculating path R. The ball centerline 73 within the ball recirculating path R and either one or both (one in this example) of the divided face $B_1$ and the divided face $B_2$ intersect at the midpoint 72 of the ball recirculating path R. The intersecting angle Φ of the divided face $B_1$ and the divided face $B_2$ is greater than 0° and less than 90°, preferably 45° or less. Note that the divided face $B_1$ in the illustrated example coincides with the central centerline 73 of the ball recirculating path R.

Furthermore, such a structure of the second divided face B that the divided faces of the respective upper and lower portions of the ball recirculating path R intersect with each other when viewed from the flat surface 20a of the nut 20 prevents unequal division of the legs 41 connected to the tongues 44 and allows keeping of the peripheral shape even with a ball screw device having a small lead angle and few circulation rolls. Therefore, the strength of the recirculating part 40 may be secured. Moreover, dividing approximately equally the flat surface of the upper side of the main body 42 and making a fixed pressure of the recirculating part 40 be approximately uniform across the entire fixed region makes elastic deformation at the time of fixation be approximately uniform, thereby making circulation of the ball 30 smoother. In addition, uniform division of the ball recirculating path R throughout the entire path allows smoother circulation of the ball 30. Note that application of the recirculating part 40 having such a configuration to a ball screw device having a lead angle of 4° or less and less than 2.5 rolls exerts particularly remarkable effects.

Alternatively, when the tongue portion 44 of the one leg is protruding further than the first divided face A, a bending portion 80 may be provided at the base of the tongue portion 44 at the first divided face A, as shown in FIG. 5(c). This bending portion 80 allows division of the recirculating part 40 without any concern regarding the strength around the tongue portion 44. In this case, a bending portion 81 is also provided on the first divided face C side so as not to interfere with the bending portion 80 of the first divided face A.

Note that the present invention is not limited to the embodiment described above, and may be appropriately modified as long as it does not deviate from the spirit of the present invention.

For example, while the recirculating part 40 is fixed on the flat surface 20a of the nut 20 via the press-down fittings 50 in the above embodiment, the recirculating part 40 may be fixed directly to the flat surface 20a of the nut 20 by setscrews or the like instead of using the press-down fittings 50.

Material, form, size, mode, number, arrangement and the like of the grooves, screw shaft, nut, balls, recirculation holes, ball recirculating paths, rotational parts, tongue portions, legs, main body, first curvature portion, second curvature portion, third curvature portion, fourth curvature portion, etc. illustrated in the embodiment described above are arbitrary and are not limited as long as they allow accomplishing the aim of the present invention.

REFERENCE SIGNS LIST

1: Ball screw device
10: Screw shaft
11: Groove
20: Nut
21: Groove
22: Recirculation holes
30: Ball
40: Recirculating parts
41: Legs
42: Main body
R: Ball recirculating path
R1: First curvature portion
R2: Second curvature portion
R3: Third curvature portion
R4: Fourth curvature portion
A: First divided face
B: Second divided face
$B_1$: Upper divided face of the second divided face B on the ball recirculating path R
$B_2$: Lower divided face of the second divided face B on the ball recirculating path R
C: First divided face

The invention claimed is:

1. A ball screw device, comprising:
a screw shaft having a spiral groove on an outer surface;
a nut having on an inner surface a spiral groove corresponding to the groove of the screw shaft and screwed with the screw shaft;
a plurality of balls loaded in a rollable fashion along a spiral raceway between both of the grooves; and
a rotational part having both ends fitted to respective recirculation holes of a pair of recirculation holes formed in a flat surface, which is bored on a circumferential side surface of the nut, in a direction approximately orthogonal to an centerline of the nut, so as to create a ball recirculating path for leading the plurality of balls rolling along the spiral raceway to the outside of the nut from one recirculation hole of the pair of recirculation holes, and returning the plurality of balls to the spiral raceway from the other recirculation hole, wherein
the rotational part comprises a pair of legs that include a tongue portion for scooping up the balls that roll along the spiral raceway on the ends of the legs in a direction approximately tangential to the spiral raceway and that have both ends fitted to the recirculation holes of the nut, and a main body connecting the pair of legs, and further comprises:

two first divided faces, one of the first faces dividing the one of the pair of legs along a first direction in which the ball recirculating path leads the balls scooped up by the tongue portion of one of the pair of legs to the outside of the nut, the other of the first faces dividing the other of the pair of legs along a second direction in which the ball recirculating path leads the balls scooped up by the tongue portion of the other of the pair of legs to the outside of the nut; and a second divided face for dividing the main body along the ball recirculating path in a third direction joining the one of the first divided faces and the other of the first divided faces, and wherein the second divided face comprises an upper divided face and lower divided face which are non-parallel, wherein a plane along the upper divided face intersects a plane along the lower divided face, wherein the plane along the upper divided face and the plane along the lower divided face are perpendicular to the flat surface of the nut, and the first and second directions are parallel to the axes of the recirculation holes.

\* \* \* \* \*